United States Patent [19]

Tsokas

[11] Patent Number: 4,772,208

[45] Date of Patent: Sep. 20, 1988

[54] APPARATUS FOR USE IN TEACHING MATHEMATICS

[76] Inventor: Athanasios Tsokas, Aretosis 85, Chalkida, Greece

[21] Appl. No.: 795,821

[22] Filed: Nov. 7, 1985

[30] Foreign Application Priority Data

Nov. 8, 1984 [GR] Greece ............................ 80890

[51] Int. Cl.⁴ ............................................. G09B 19/02
[52] U.S. Cl. .................................. 434/192; 434/195; 434/205; 434/210; 434/416
[58] Field of Search ............... 434/210, 195, 191, 192, 434/200, 205, 408, 416, 421, 429, 430, 432

[56] References Cited

U.S. PATENT DOCUMENTS

| | | | |
|---|---|---|---|
| 234,247 | 11/1880 | Classen | 434/195 |
| 516,005 | 3/1894 | Geer | 434/432 X |
| 617,883 | 1/1899 | Paul | 434/200 |
| 629,891 | 8/1899 | Cunningham | 434/191 |
| 1,471,437 | 10/1923 | Wood | 434/195 |
| 3,263,347 | 8/1966 | McCutcheon | 434/430 |
| 3,908,287 | 9/1975 | Darnell | 434/210 X |

FOREIGN PATENT DOCUMENTS

| | | | |
|---|---|---|---|
| 75650 | 2/1919 | Austria | 434/210 |
| 445169 | 2/1949 | Italy | 434/191 |

*Primary Examiner*—William H. Grieb
*Attorney, Agent, or Firm*—Hoffman, Wasson & Fallow

[57] ABSTRACT

An apparatus for teaching mathematics which applies and puts to work in various ways the modern teaching of mathematics for all levels of elementary education through set theory, comprises a horizontal board divided into eleven zones and having two outwardly-projecting subsidiary boards. In use, objects can be placed in selected zones of the horizontal board to demonstrate mathematical operations, and information relating to the operation is written on appropriate zones of the vertical board and on the subsidiary boards. The horizontal board has a bevelled front edge portion on which further information can be written, and two portions in which objects to be placed in the zones of the horizontal board can be placed beforehand.

2 Claims, 24 Drawing Sheets

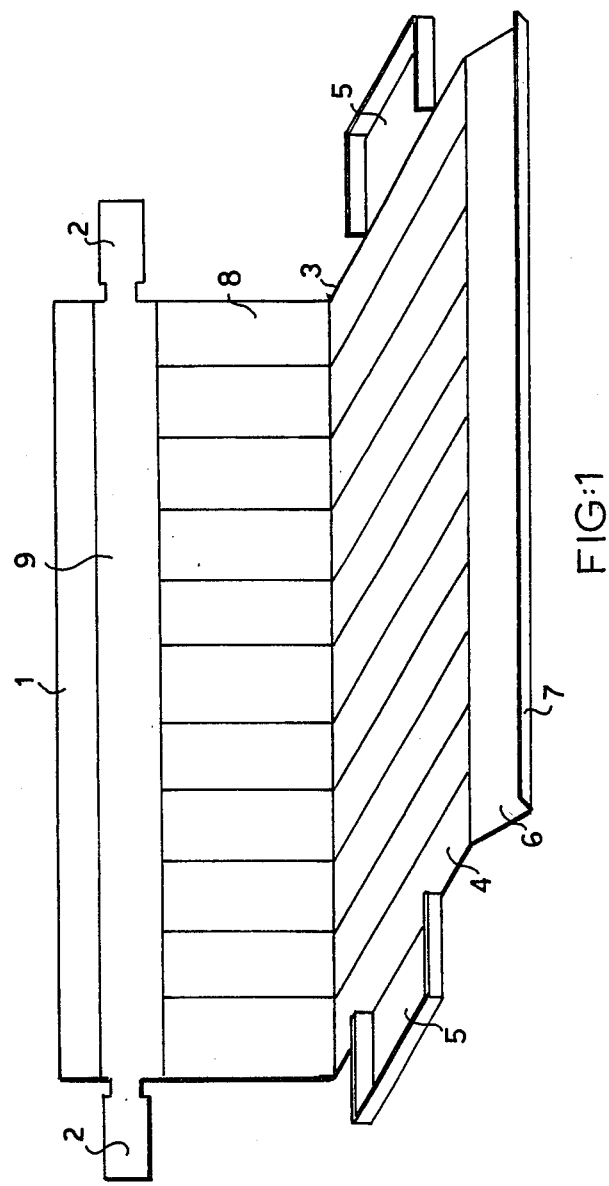

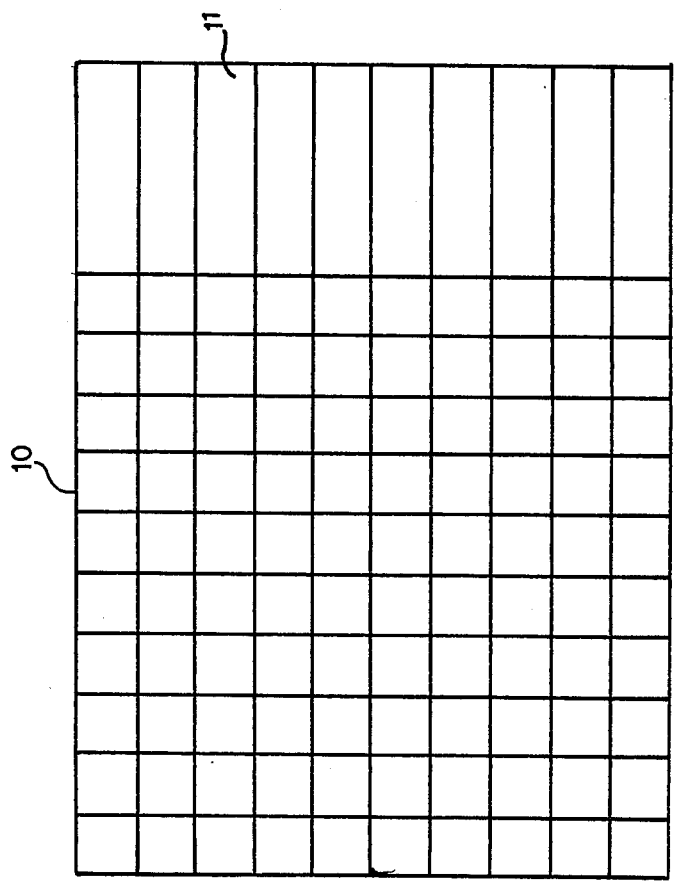
FIG:2

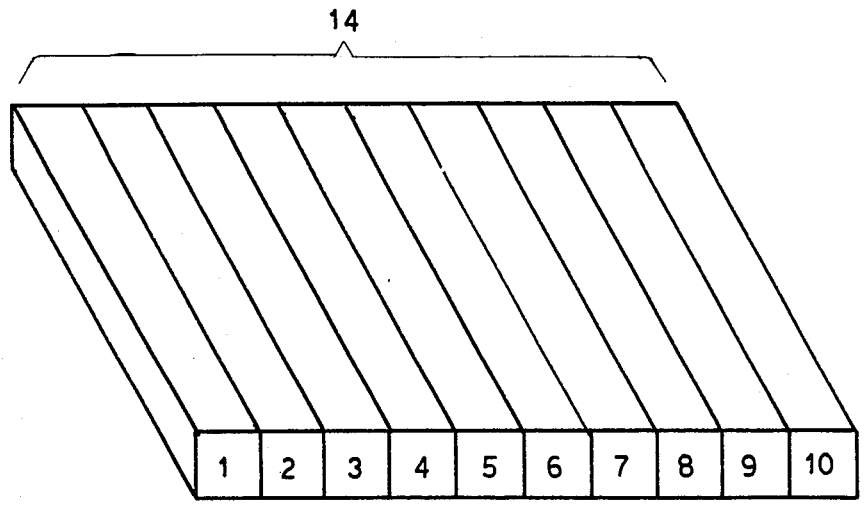
FIG:4
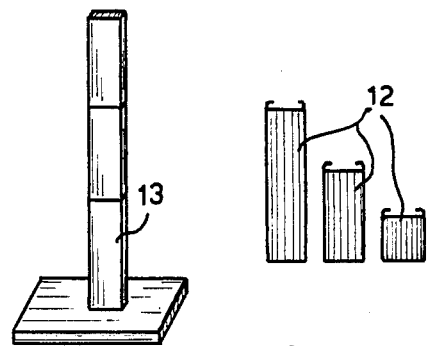
FIG:3

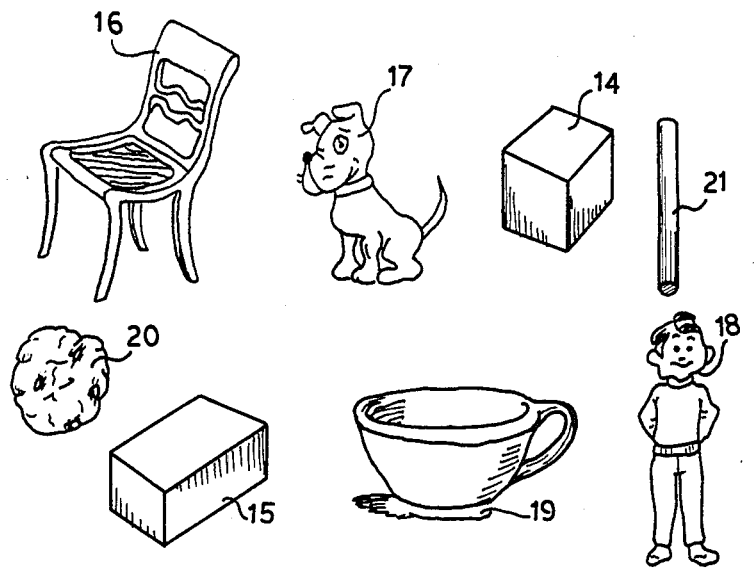
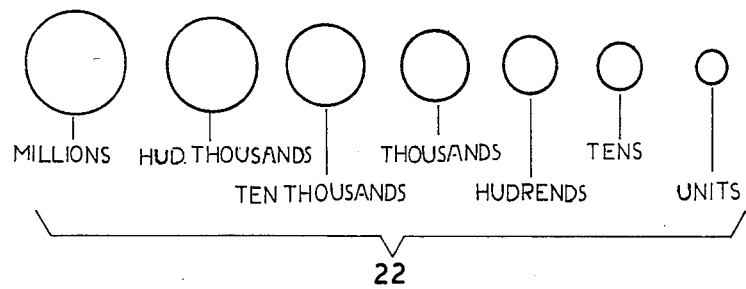
MILLIONS HUD.THOUSANDS THOUSANDS TENS
TEN THOUSANDS HUDRENDS UNITS
22
FIG:5

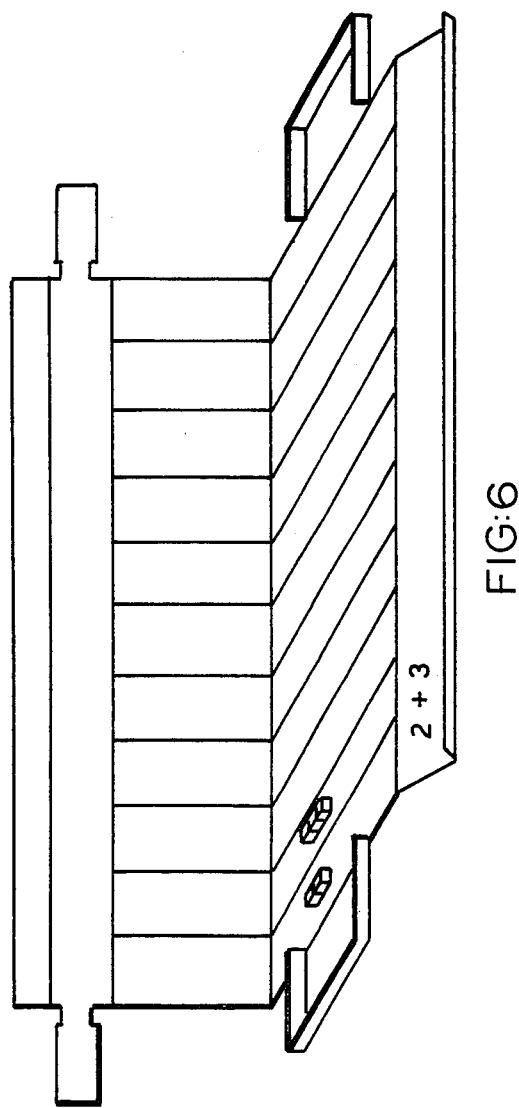
FIG:6

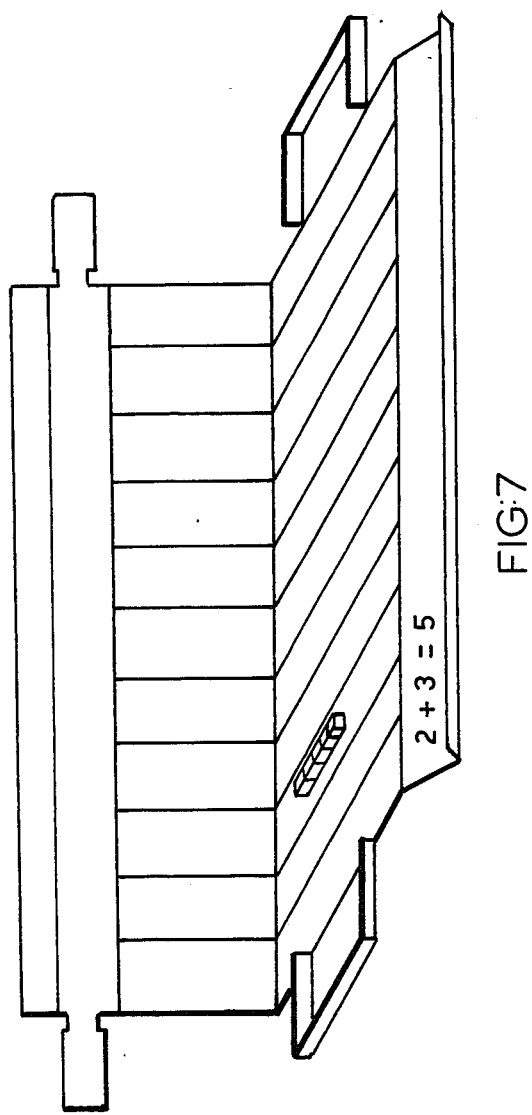

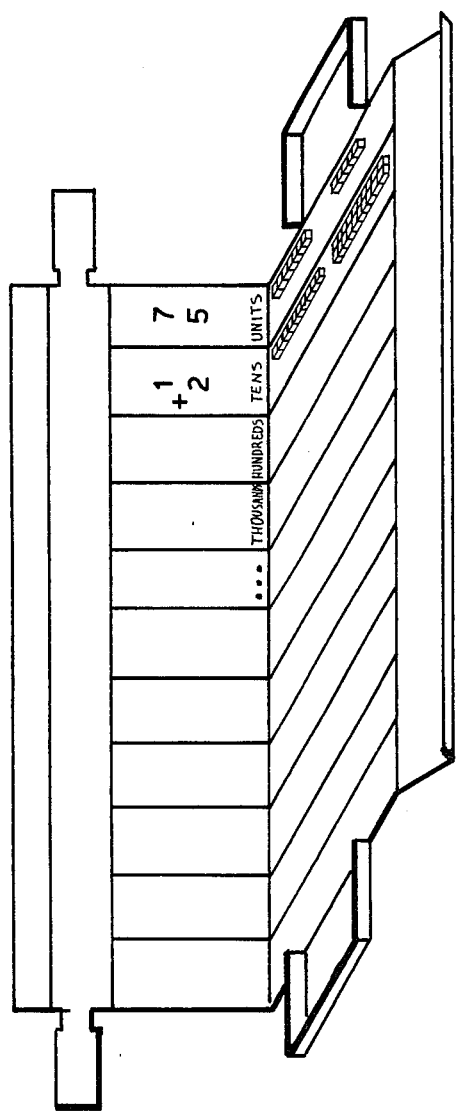
FIG:8

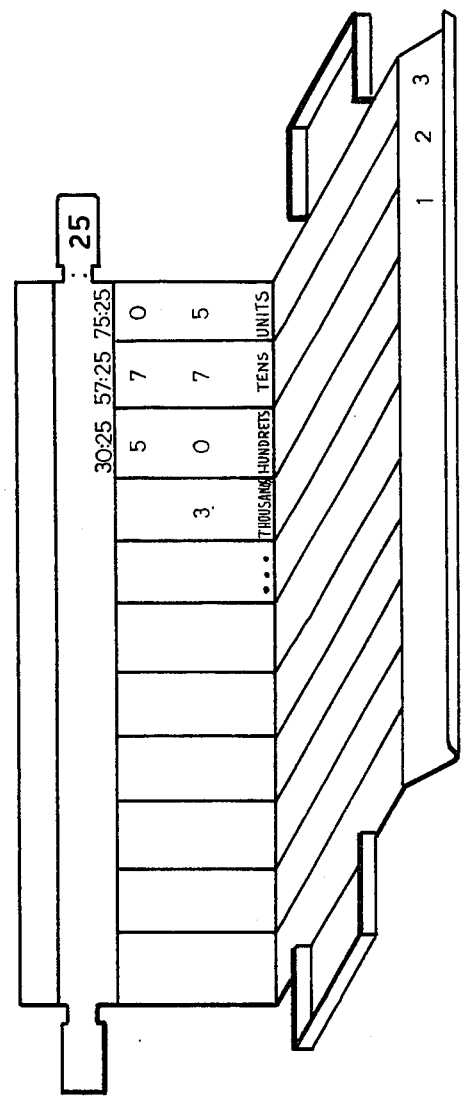
FIG:25

APPARATUS FOR USE IN TEACHING MATHEMATICS

OBJECTS AND SUMMARY OF THE INVENTION

This invention relates to apparatus for use in teaching mathematics.

The invention has the object of providing an apparatus which assists scholars in their learning of mathematics and thus facilitates the teaching of the subject.

According to the invention, there is provided an apparatus for use in teaching mathematics, comprising a surface for receiving thereon objects representing numbers, the surface being divided into zones appropriate to the demonstration of a mathematical operation by means of the objects, and an associated display means for graphically displaying information relating to the mathematical operation being demonstrated. For example: Addition or subtraction, multiplication or division, properties, conversion from decimal system into binary systems, inequalities and equations of the first degree of the form.

The objects used in the demonstration of the mathematical process can be of any convenient type such as geometrical shapes, counters, or small blocks but are preferably of a more visually-appealing nature, for example by being shaped to resemble cars, animals, people, furniture etc. The objects may also be of at least two visually-distinguishable types, for example by comprising a number of objects of a first colour and a number of the same shape but, in at least in part of a second, different colour.

Preferably, the display means comprises a display surface on which mathematical characters can be removably displayed.

Advantageously, the surface includes a pair of outwardly projecting subsidiary surface portions at respective opposite sides of the display means and, thus, at each side of the display surface can be a small board for writing mathematical functions on.

The mathematical characters may be numerals, letters of any alphabet, mathematical symbols or any other characters. They may be displayed by use of chalk, erasable ink, detachable labels or other elements, or in any other way.

The display surface is advantageously divided into zones co-ordinated with the zones of the object-receiving surface. In use of such apparatus, the objects received upon the zones of the object-receiving surfaces can be represented in corresponding zones of the display surface by appropriate characters such as the numeral corresponding to the number of objects.

The object-receiving surface and display means may be orientated in any convenient way but are preferably mutually-inclined so that, in use, the object-receiving surface can be set generally-horizontally with the display means extending upwardly therefrom to be viewed simultaneously with objects placed on the object-receiving surface. In such an apparatus, the objects can be simply placed on their surface. However, when this surface is not generally-horizontal, magnetic or other removable attachment means, such as peg-and-socket arrangements, can be used.

The invention can provide an apparatus which can be, for example, of the size of a school blackboard to be hung in a classroom, or of a small size able to be stood on a table or a school desk for use by an individual pupil in the classroom.

The apparatus can be used as a pictorial means of teaching arithmetic to pupils in elementary education and to students of the first classes in high school, to be able to understand mathematics with a new art of teaching (3-dimensions and symbolic presentation) through the sets theory.

When arranged to the orientated generally-horizontally, the object-receiving surface may have at least one portion where objects not occupying the zones of the surface can be received. Thus, at each side of the generally-horizontal board, there may be a location for pictorial display objects or elements.

On the display surface which may be divided into zones, used for the symbolic representation of arithmetic or other mathematical functions, for example by inscribing of the individual numbers that make up an arithmetic function, other boards, divided into different zones or squares or other geometric shapes, can be positioned through which mathematic inequalities, set theory etc. can be demonstrated. Accordingly, the display surface advantageously comprises at least one demountable element having surface markings, for the disply of a predetermined type of graphical information.

The invention also provides an object for use with apparatus according to the invention, comprising a stem member having means for its support by or on the object-receiving surface of the apparatus and a plurality of elements which are detachable from the stem member and of different heights to represent different fractions of unity.

The support means may comprise a base for support on a generally-horizontal surface but may otherwise comprise magnetic or peg or socket means to attach to surfaces orientated in others planes. Thus, on a horizontal surface, the stem members may be positioned, standing by means of their bases or some other means that helps them stand. The detachable elements for the presentation of functions involving fractions can be assembled onto these stems. These elements, when not in use, may be kept arranged by size in a case with separate compartments.

It should be noted that the presentation of pictorial elements in the form of the well-known manual and other adding machines and calculators, bears no similarity to the present invention, both constructionwise and functionwise.

BRIEF DESCRIPTION

The invention can be put into practice in various ways, some embodiments being shown in the drawings, in which:

FIG. 1 is a perspective view of an apparatus embodying the invention,

FIG. 2 shows, in elevation, an additional board,

FIG. 3 shows a device for representation of fractions,

FIG. 4 is a schematic perspective view of a case in which elements representing fractions can be arranged, FIG. 5 presents various forms of display objects and FIGS. 6 to 25 show the device of FIG. 1 in the demonstration of respective different mathematical operations.

Figure 9:
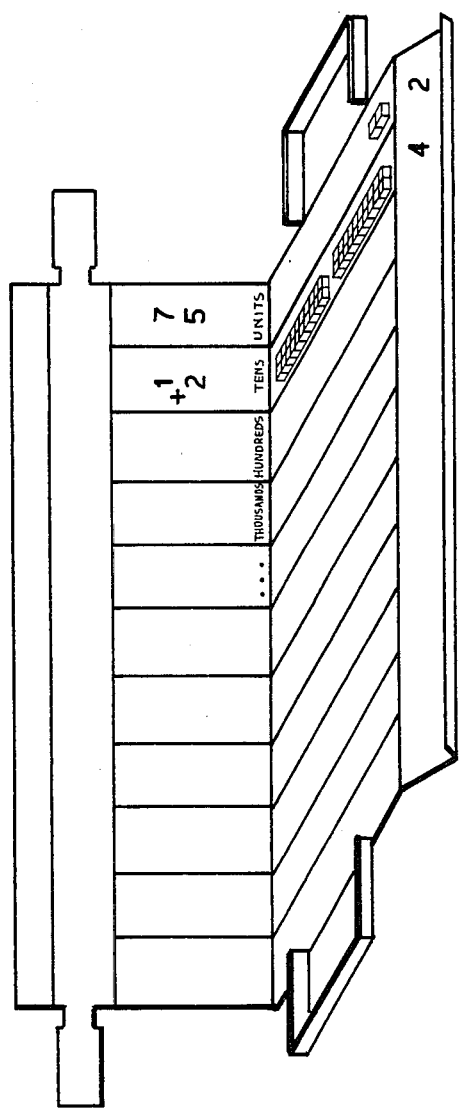

Referring now to FIG. 1, the apparatus is shown to comprise a vertical board (1), made from any suitable material (wood, plastics, metal, etc.) and bearing two little subsidiary boards (2), one on each side. On the vertical board (1), vertical lines and horizontal lines are drawn. These define a set of contiguous eleven zones (8), having the vertical lines as common sides, and a horizontal zone (9) which extends adjacent the set of zones (8) parallel to the direction of extent of the set. On the vertical board (1) one can write onto all the areas of board as shown in FIG. 1 (left and right little blackboards (2) center blackboard (9) and all vertical zones (8) with chalk arithmetic functions and numbers corresponding to the pictorial elements or other display objects placed on each zone (4) of a horizontal board (3).

The horizontal board (3) is divided into eleven zones (4). The one edge of this board is assembled onto the bottom edge of the vertical board (1), whereas the other edge carries an inclined narrow blackboard (6). Onto the horizontal board and within the zones (4), which are the continuations of the vertical zones (8), the pictorial elements shown in FIG. 5 can be placed.

Storage areas (5) for the pictorial elements are attached one on each side of the horizontal board (3). In these areas (5), the total of the elements of FIG. 5 may be placed, when an arithmetic function is to be analysed.

On the inclined narrow blackboard board (6) attached at the front edge of the horizontal board (3), one may write in conjunction with writing on the vertical board (1), the results of various combinations of functions.

A support (7) at the edge of the inclined board (6) is provided to hold chalk and display objects or pictorial elements.

In the vertical zones (8) on the vertical board (1), the individual numbers that make up an arithmetic function are written, which numbers in turn represent the number of pictorial elements that are placed in the corresponding zones (4) of the horizontal board (3).

The horizontal zone (9) on the vertical board (1) can be used for writing an arithmetic function to be analysed in the other parts of the apparatus.

FIG. 2 shows a board (10) which is divided into one hundred squares and an additional zone (11) for writing sums. It is used for the anaylsis of inequalities and quantity numbers in set theory.

FIG. 3 (12) shows a display object in the form of an element for the pictorial representation of the subdivision of unity into fractions. For each individual fraction, there is a corresponding sub-element of height proportional to the fraction. These sub-elements are kept in the corresponding compartments of the case shown in FIG. 4. The Elements can be made from a material with magnetic properties, so that they can stick onto a metal vertical bar (13) (FIG. 3), or alternatively made of plastic or other suitable material, bearing appropriate edge formations, or any other system, capable of keeping them attached to the vertical bars (13), whenever required.

The vertical bar (13) has a base, for placing on the zones (4) of the horizontal board (3). Alternative vertical bars (13) can also be made to stand by any other means on the horizontal board, such as by being assembled into preformed holes.

The case shown in FIG. 4 is divided into compartments. At the front, these compartments are labelled by the numbers of the subdivision of unity and inside these compartments the elements of FIG. 3 are arranged.

FIG. 5 shows a pictorial element (14 or 15) representing a unit in the shape of a cube. Other pictorial elements as circular rings (indicated by numberal 22) in increasing diameters and different colour or shape, can represent tens, one hundred, one thousands, ten thousands, one hundred thousands, one million, etc. of counting system in set theory. As examples of other shapes of pictorial element there are chairshaped elements (16), dog-shaped elements (17), people-shaped elements (18) and cup-shaped elements (19), all shown in FIG. 5.

The apparatus described also includes a sponge and chalk, indicated by (20 and 21), as shown in FIG. 5, for writing and erasing on the boards (1, 6 and 9). chalk, any other suitable writing material can be used.

DETAILED DESCRIPTION OF THE INVENTION

The functioning of the device which embodies the invention aims at the analysis and interpretation of arithmetic functions, concerning whole numbers, decimal numbers, fractions, arithmetic properties, problems, counting systems and set theory.

The sub-functions, their analysis and the results are written in the zones (8) of the blackboard (6). Onto the board (3), the elements of FIG. 5 are positioned pictorially, so that the pupil has a clear sight of each unit in relief, and of the total of the units as a number, and can combine the graphical presentation of the units and the numbers, with the writings on the zones (8 and 6).

The method of analysis of the arithmetic functions and the accompanying functioning examples of the device, are unlimited and can be created accordingly to the teachers or pupil's wish.

For an understanding of the functioning of the described device, examples of various functions are explained as follows, reference being made to FIGS. 6 to 24 of the drawings:

EXAMPLE ONE

To find pictorially the sum of the numbers 2 and 3, we place in the first zone of the horizontal board (FIGS. 1 and 3) two cubes and in the next zone three cubes. Then we write symbolically onto the inclined board the sum as $2+3$ (FIG. 6). Then we transfer the small cubes of the two zones to the third zone and therefore we get both the pictorial and the symbolic presentation of the number 5 which is the sum of the numbers 2 and 3. To finish, we complete onto the inclined board the equality as being $2+3=5$ as shown in FIG. 7.

EXAMPLE TWO

To find pictorially the sum of the numbers 17 and 25, we write the numbers in the zones (8) of the vertical board (2) from its right hand side, naming the zones as follows: 1st zone, the zone of units, 2nd zone, the zone of tens, etc. as shown in FIG. 8. In the zones (4) of the horizontal board, we perceptualise the number 17 by placing ten cubes in the tens zone, and seven cubes in the units zone (FIG. 8). In the same manner we perceptualise the number 25 (see also FIG. 8). Making the addition of the 5 units with the 7 units, we have in total 12 units, from which we make one unit of ten and we are left with two single units (FIG. 9). We transfer the one unit of tens to the tens zone and we add it to the total of tens of this zone which is now 4. Accordingly we write on the inclined board the number of tens and the number of units, hence we get the number 42 (FIG. 9), which is the sum of the numbers 17 and 25.

EXAMPLE THREE

Figure 10:
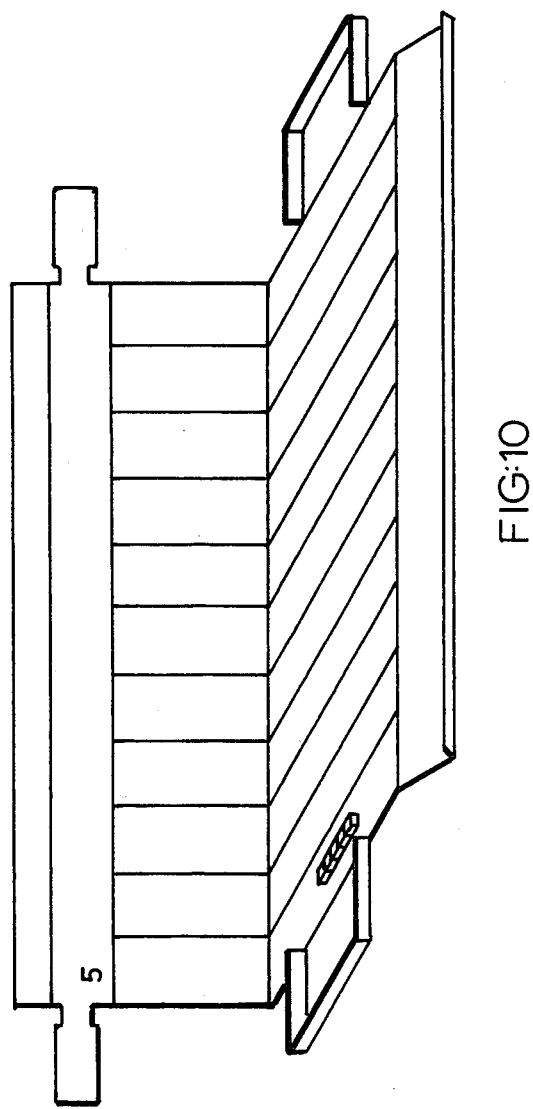
Figure 11:
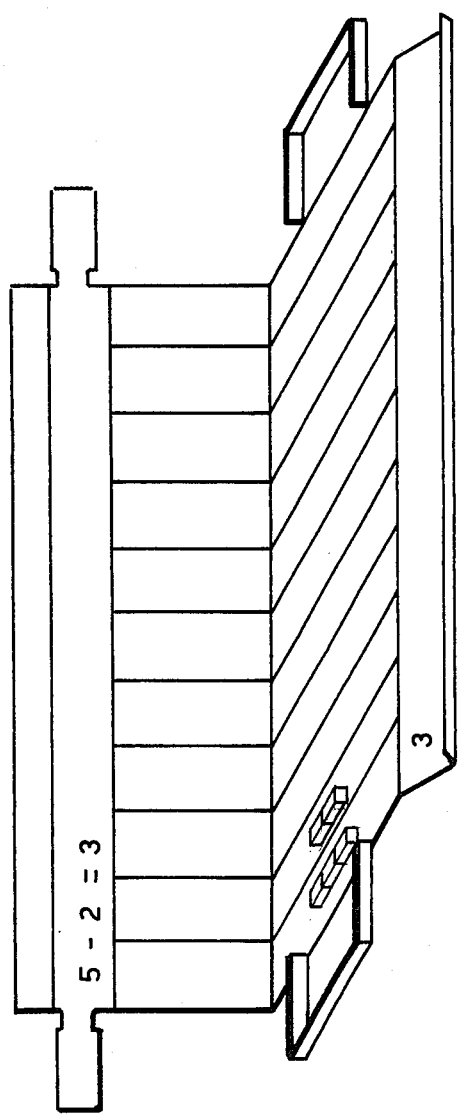

In order to find pictorially the result of the subtraction 5−2, we place in the first zone of the horizontal board (3) (starting from the left), 5 cubes and and we write on the horizontal zone (9) of the vertical board at the corresponding position of the first zone (4), the number 5 (as shown in FIG. 10). From these 5 cubes, we take 2 and place them in the next zone (as shown in FIG. 11) so that in the first zone there are only 3 cubes left which is in fact the result of the subtraction 5−2=3. The number 3 we write onto the inclined blackboard (6) and at the position of the first zone, whereas in the horizontal zone of the vertical board we fill in the quality 5−2=3.

EXAMPLE FOUR

Figure 12:
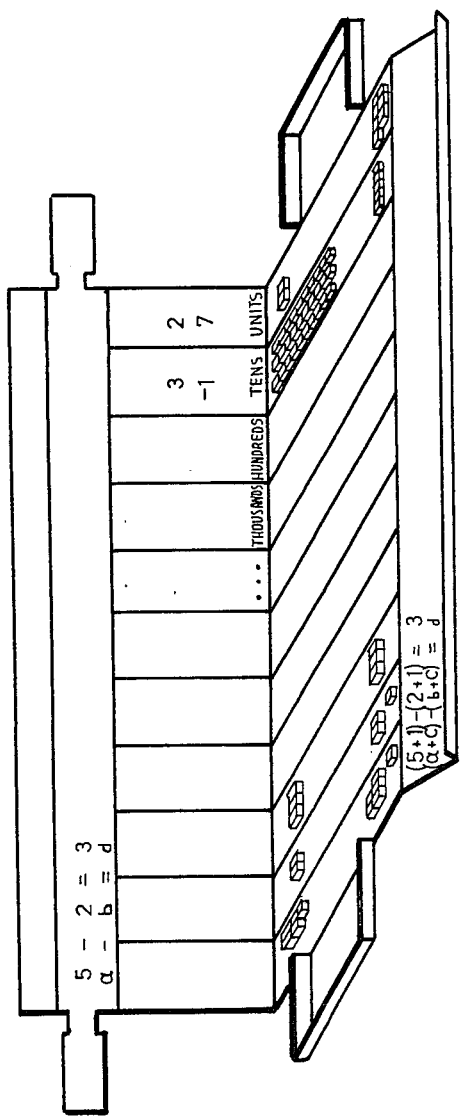
Figure 13:
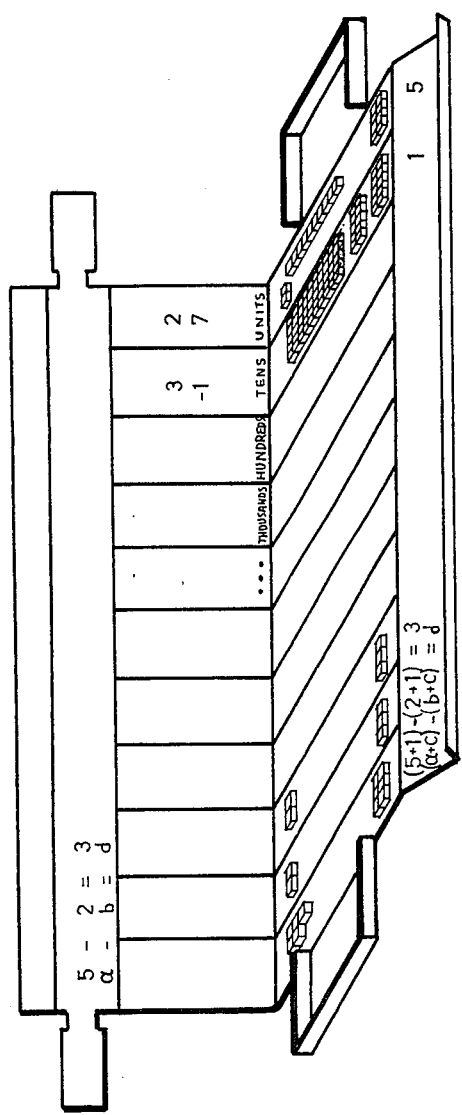

To find pictorially the result of the subtraction 32−17, we perceptualise the subtraction as shown in the FIG. 12 (right hand side of the device). At the left hand side of the device (blackboard FIG. 1 (9) we present an example of the property $a-b=(a+c)-(b+c)$ as shown in the FIG. 12. Moving now on to the zone of units we see that the 7 units cannot be subtracted out of the 2 units. Therefore, following the $a-b=(a+c)-(b+c)$ property that we present at the left of the device, we add onto the biggest number 32, a unit of ten cubes (i.e. ten simple units) and so, together with the 2 units of the 32, they become 12 (FIG. 13). However in the same way that we added ten units onto the biggest number, we must also add ten units on the smallest number i.e. the 17. Therefore, one unit of tens that we added, plus one unit of ten that the number 17 has, make altogether 2 units of tens, which, if we subtract from the 3 units of tens that the number 32 has, we are left with 1 unit of tens. Also, if we subtract the 7 units from the 12 units, we are left with 5 units. Hence the result of the subtraction 32−17 is the number 15 as shown in FIG. 13.

EXAMPLE FIVE

Figure 14:
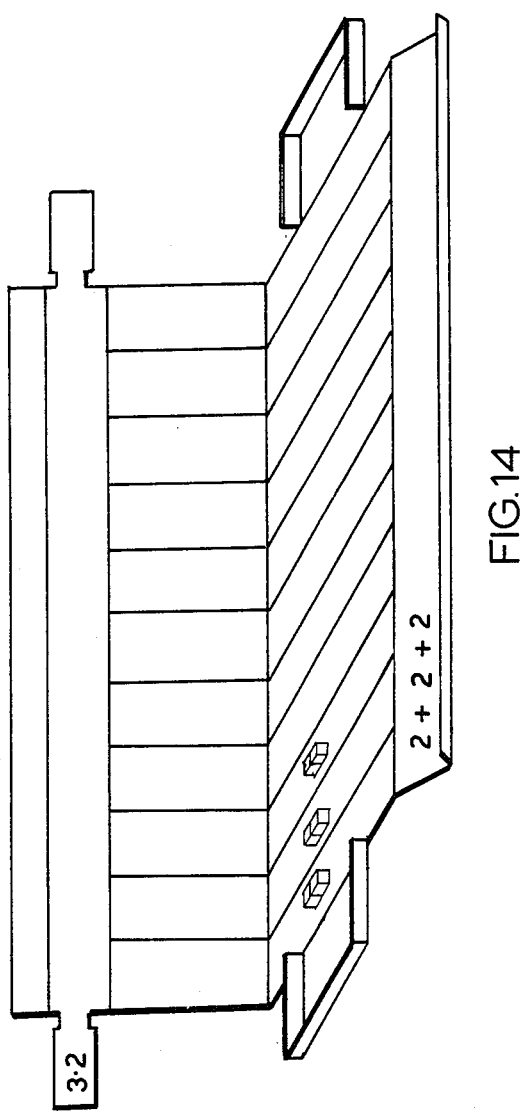
Figure 15:
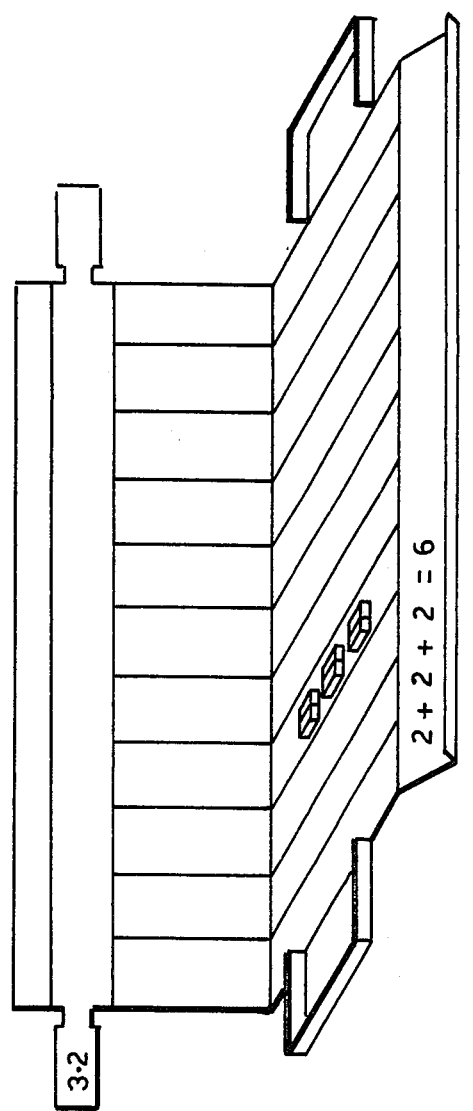

To find pictorially the result of the multiplication 3×2, we write it on the left little blackboard (2) of the device (as shown in FIG. 14). Then we form three (3) columns of cubes containing two (2) cubes each, and we place them in the first three zones of the horizontal board (3) thus each zone contains two (2) cubes (FIG. 14). Onto the inclined blackboard (6) the device, we write the sum 2+2+2 corresponding to the cube of each zone. Following this, we transfer the three (3) columns of cubes to the fourth zone of the horizontal board and we observe that the total quantity of cubes in the fourth zone is 6 (as shown in FIG. 15).

EXAMPLE SIX

Pictorial verification of the multiplication property $a(b+c)=ab+ac$

Property example: 5 (2+3)=5 2+5 3)

We write on the left little blackboard (2) of the device the product 5.(2+3)

Figure 16:
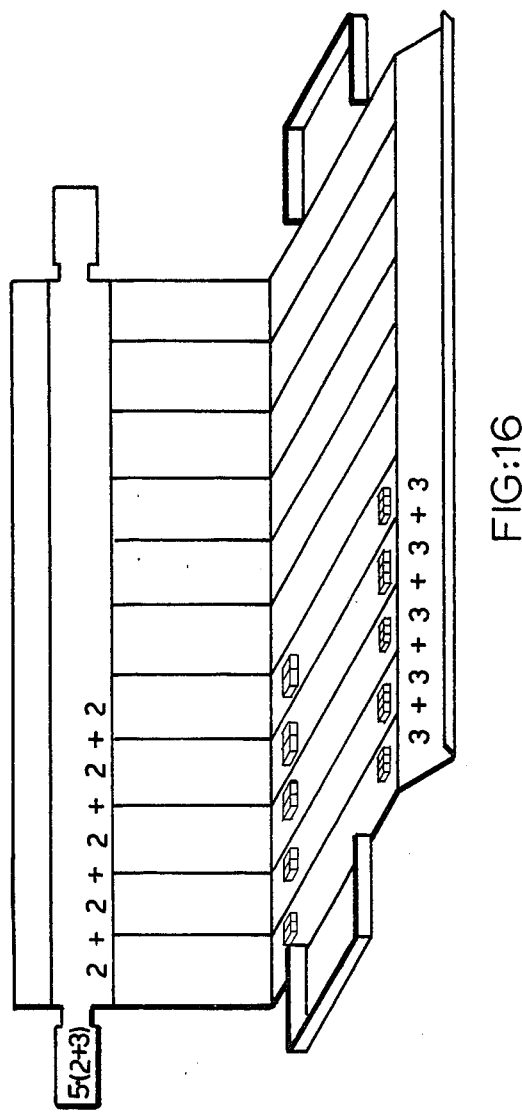

We place in each of the first 5 zones of the horizontal board (3) 2 red cubes and 3 green ones (as shown in FIG. 16).

Figure 17:
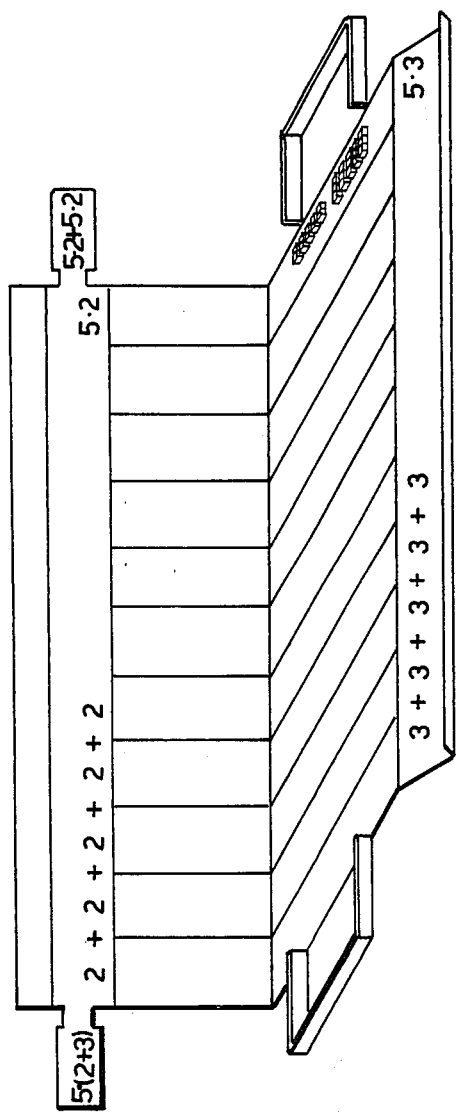

According to the red and green cubes of each zone, we write onto the horizontal zone (9) of the vertical board (1) the sum 2+2+2+2+2 and onto the inclined blackboard (6) the sum 3+3+3+3+3 (FIG. 16). Then we transfer the 5 sets of 2 red cubes and the 5 sets of 3 green cubes to the last zone of the device. So in the last zone now coexist together the 5 sets of two red cubes and the 5 sets of three red cubes which is pictorially the sum 5.2+5.3, and we write it on the right little blackboard (2) (FIG. 17).

EXAMPLE SEVEN

Conversion of the number 13 (decimal system ) into the binary system.

Figure 18:
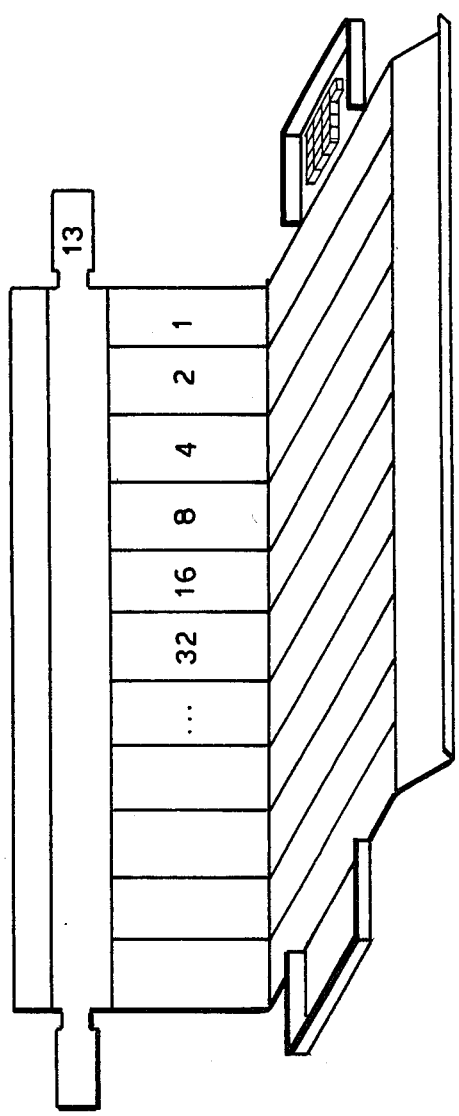
Figure 19:
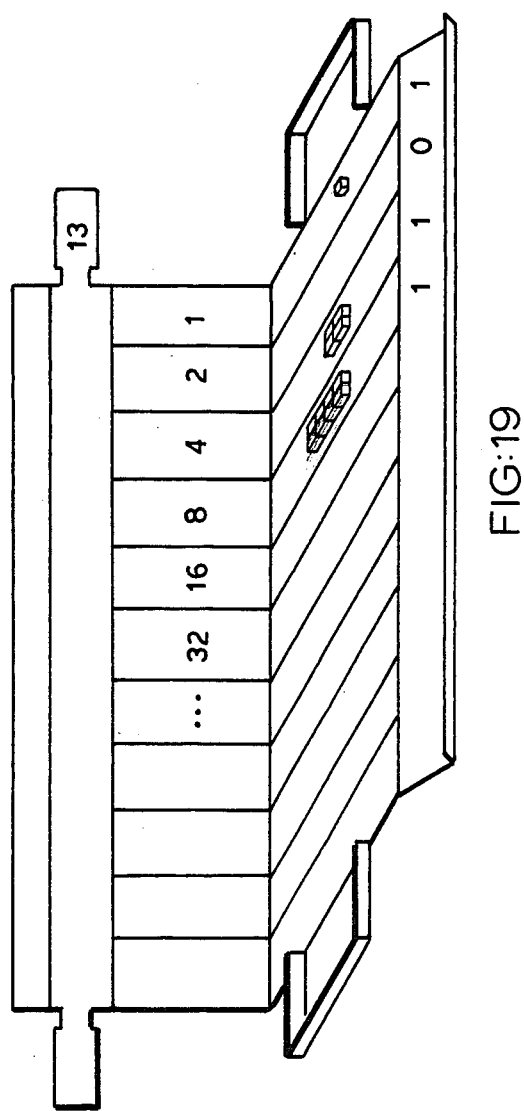

We write the number to be converted onto the small blackboard (2) which is on the right upper side of the device, (as shown in FIG. 18), and on the right hand entrance platform (5) we place 13 little cubes. We also write on the device in zones (8) of the vertical board the order of the binary system (FIG. 18). Accordingly to this order of the now binary device, from the 13 cubes that represent the number 13 we make one unit of eight, one unit of four, zero (0) units of twos and one single unit. Therefore the representation of the number 13 in the binary form is 1 1 0 1, which we write onto the inclined blackboard (6) of the device (as shown in FIG. 19).

EXAMPLE EIGHT

Figure 20:
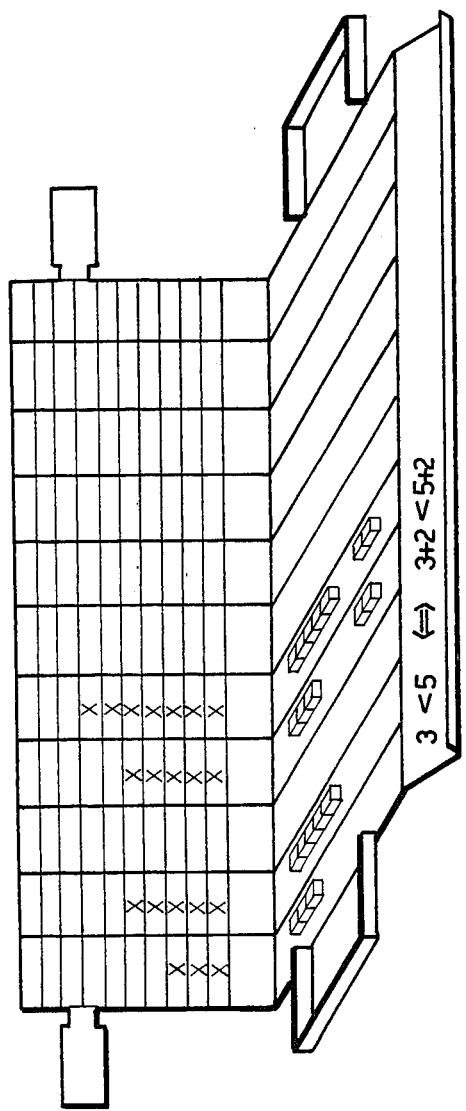

To present pictorially the property $3<5 \longleftrightarrow 3+2<5+2$, we position onto the vertical board (FIG.1(1) of the device, the board which is divided into one hundred squares, (as shown in FIG. 2, (10)). The pictorial and sumbolic verification of the above property is shown in FIG. 20.

EXAMPLE NINE

Figure 21:
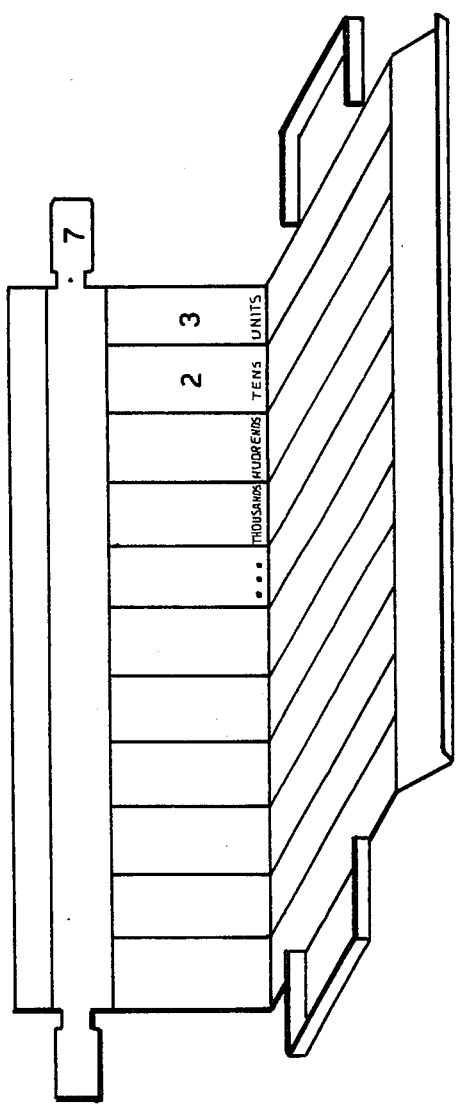
Figure 22:
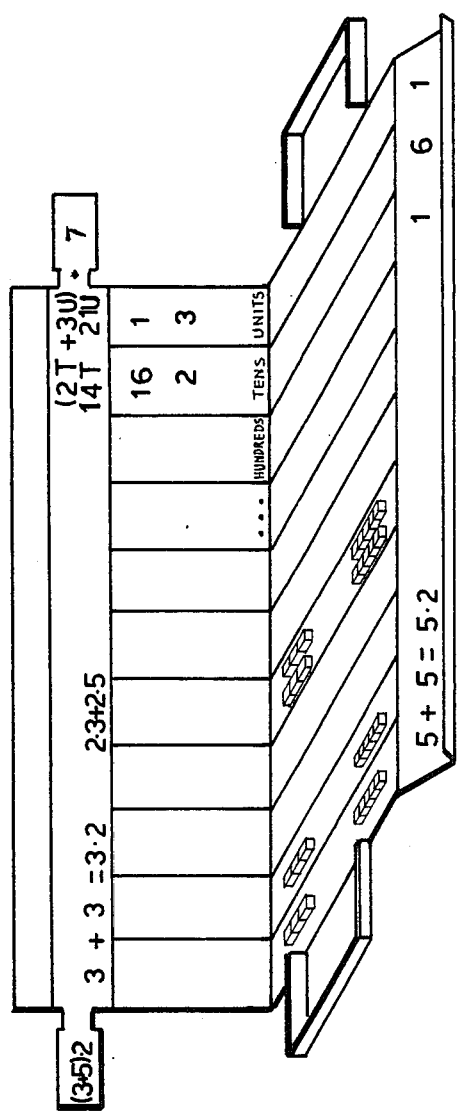

In order to find pictorially the product 23.7, we arrange the constituents of the multiplication, i.e. the numbers 23 and 7, onto the vertical board (1) as shown in FIG. 21. Applying the multiplication property described with reference example six (no. 6), which is also written on the left side of the vertical board (FIG. 22) we follow the procedure as it is given by FIG. 22 on the right hand side of the vertical board.

EXAMPLE TEN

Conversion of the number 1101 of the binary system to the decimal system.

Figure 23:
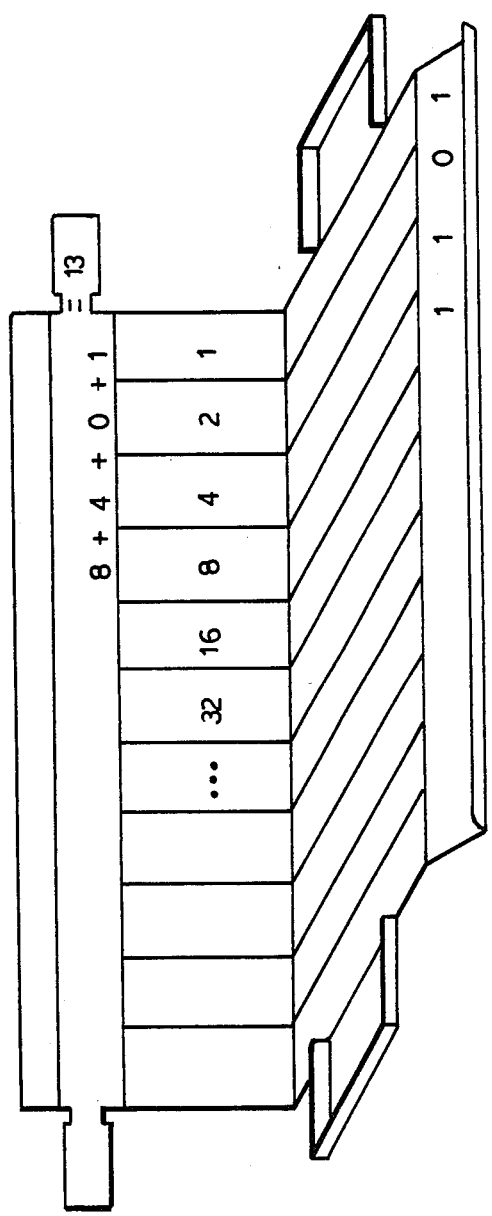

We write the number 1101 (base 2) onto the inclined blackboard (6) of the device (as shown in FIG. 23) and also the orders of the binary system (FIG. 23). In this way we see that the number 1101 (base 2) consists of one (1) unit of eights, one unit (1) of four, zero (0) units of twos, and one (1) single unit, i.e. this is the number 13 of the decimal system (see FIG. 11).

EXAMPLE ELEVEN

Figure 24:
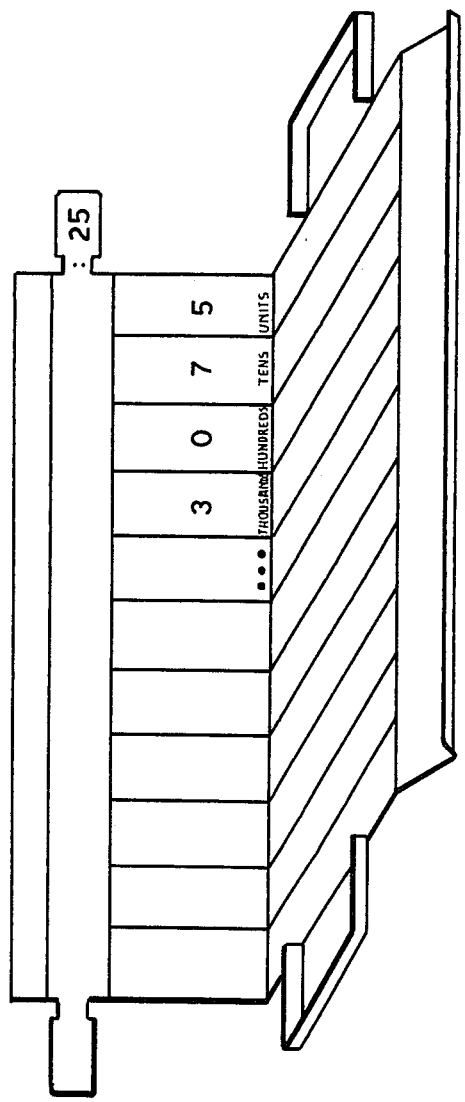

To perform pictorially the division 3075:25, we arrange the divident and the divisor onto the vertical board (1) of the device as shown in FIG. 24 and then for the procedure of the execution of the division we follow the steps as in FIG. 25.

From the foregoing description, it will be seen that this invention can provide an arithmetic learning device which is characterized by the fact that it comprises a vertical board at the bottom edge of which is assembled a horizontal board for positioning and displaying pictorial elements and at the edge of which is assembled a second inclined blackboard, two little blackboards, one at each side of the vertical board, and two storage locations (entrance platforms), one at each side of the horizontal board. The vertical and the horizontal board can bear divisions into lines.

The arithmetic learning device is preferably further characterized by the fact that is is accompanied by anumber of elements that can be cubes or other geometric shapes, or other pictorial elements such as animals, people, machines etc. with which, single units, units of tens, units of hundreds etc. can be presented.

The device may advantageously be characterized by the fact that it can be completed by elements comprising vertical bars and bases or some other system to keep them assembled onto the horizontal board, on which bars can be attached to the elements representing the varius orders of fractions (decimal subdivision of unit), either by use of magnets or some other appropriate system.

It must be appreciated that this invention is not limited to the above examples. The realisation of the invention is also possible by means of other constructional ways, methods, parts and mechanisms that lie within the scope of the invention.

Having described my invention as above, what I want to claim as new and I want to protect with the patent is:

1. An apparatus for teaching mathematics through set theory, comprising
    a horizontal board having an upper surface divided into a first plurality of zones for receiving thereon objects representing numbers,
    a vertical board attached to the horizontal board along the bottom edge of the vertical board, said vertical board having a surface for removably displaying graphic information, said vertical board surface being divided into a second plurality of zones corresponding to said first plurality of zones, and
    a pair of outwardly projecting portions extending laterally from said vertical board, usable as blackboards.

2. The invention of claim 1, wherein said second plurality of zones divides the vertical board surface horizontally, and further comprising means defining an additional zone, adjacent to and above said second plurality of zones, extending between said outwardly projecting portions.

* * * * *